Inventor
Michael A. Endres
By
Attorneys

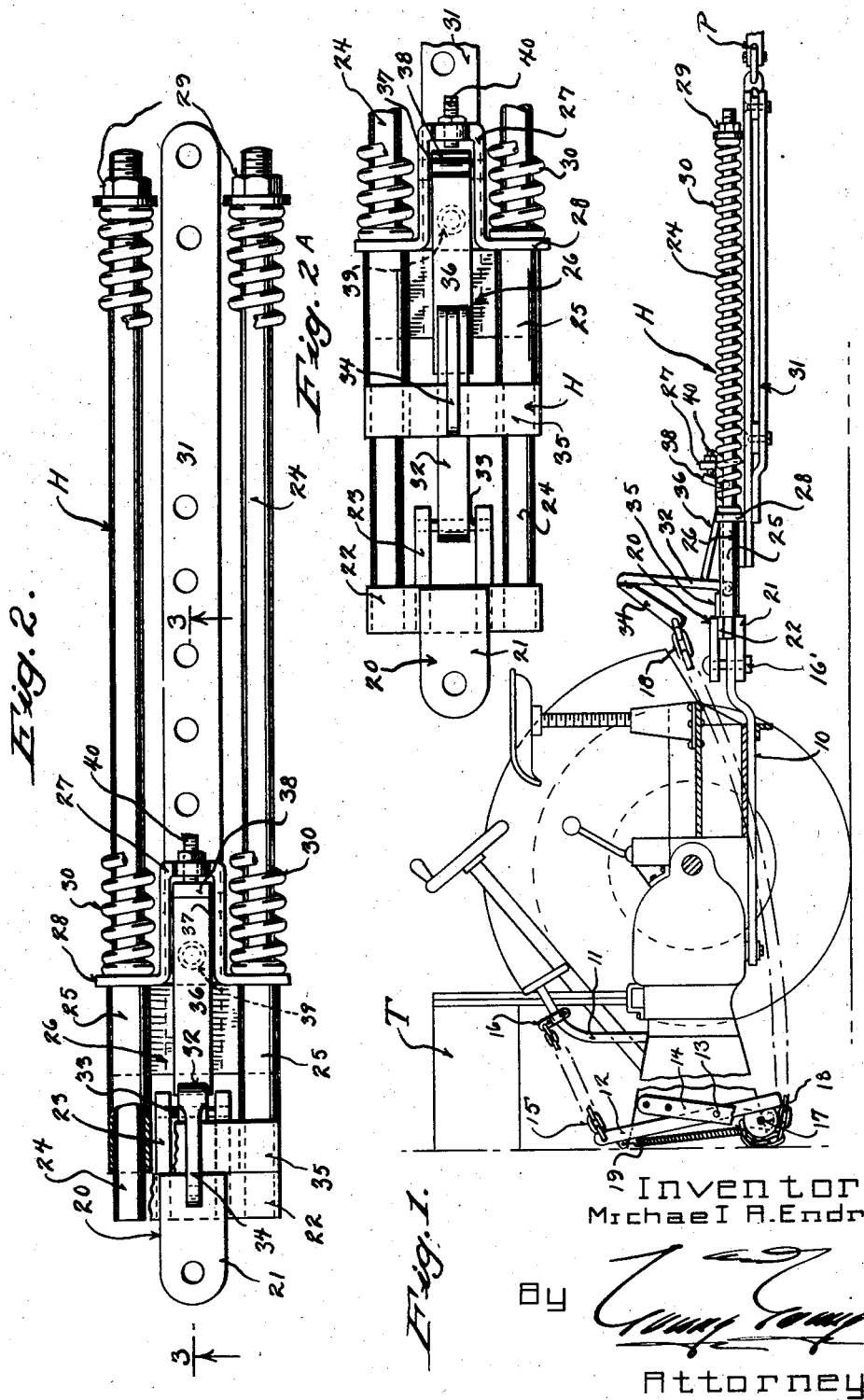

Patented June 23, 1942

2,287,516

UNITED STATES PATENT OFFICE 2,287,516

TRACTOR HITCH

Michael A. Endres, Cross Plains, Wis.

Application April 29, 1940, Serial No. 332,330

11 Claims. (Cl. 180—14.5)

This invention appertains to plow hitches, and more particularly to novel means for resiliently connecting a plow or similar farm implement to a tractor.

One of the primary objects of my invention is the provision of a plow hitch which will be of exceptionally simple and durable character, and which will effectively connect the plow to the tractor and permit plowing under ordinary working conditions, but which will immediately bring about the automatic throwing out of the clutch and longitudinal movement of the hitch parts upon impact of the plow with a solid object, whereby injury to the plow will be prevented.

Another salient object of my invention is to provide relatively long cushion springs between the hitch parts for allowing movement of the hitch parts upon impact of the plow with a solid object and permitting the automatic return of the hitch parts to normal position without the backing of the tractor when plowing is ready to be resumed.

A further object of my invention is to arrange the relatively long cushion springs relative to the trip lever in such a manner that the springs will serve a dual purpose of, first, holding the trip lever in place to carry the load under normal plowing conditions, and, second, of cushioning and taking up the shock after the actuation of the trip.

A further important object of my invention is to provide a swinging lever on the hitch for operating the clutch pedal upon impact of the plow with a solid object, and means for normally preventing movement of the lever under ordinary plowing conditions and operable only upon the impact of the plow with a solid object, said means being adjustable for allowing movement of said lever under different draft loads, whereby the hitch can be set for various plowing conditions.

A still further object of my invention is to provide novel means for actuating the clutch of the tractor from the hitch upon the actuation of the trip lever and for holding the clutch in its thrown-out position until released by the operator.

With these and other objects in view, the invention consists in the novel construction, arrangement and formation of parts, as will be hereinafter more specifically described, claimed, and illustrated in the accompanying drawings, in which drawings:

Figure 1 is a fragmentary, side, elevational view of a tractor, showing my improved hitch connected therewith, parts of the view being shown broken away and in section, the hitch being in its normal pulling position.

Figure 2 is an enlarged, top, plan view of my improved hitch, with parts thereof broken away and in section, the hitch being shown under its normal plowing conditions.

Figure 2A is a fragmentary, top, plan view of the hitch similar to Figure 2, but showing the separation of the hitch parts caused by the striking of the plow against a solid object.

Referring to the drawings in detail, wherein similar reference characters designate corresponding parts throughout the several views, the letter H generally indicates my hitch for connecting a tractor T with a plow coupling P.

Figure 3:
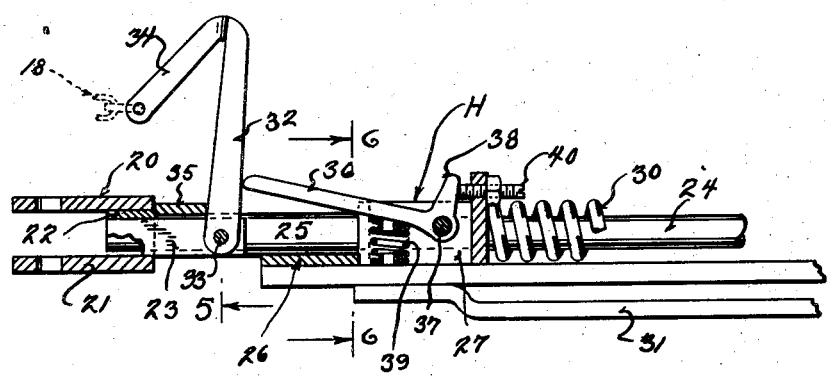
Figure 3 is an enlarged, fragmentary, longitudinal, sectional view through the hitch, taken on the line 3—3 of Figure 2, looking in the direction of the arrows, the hitch parts being shown in their normal position for plowing under ordinary conditions.

The tractor T can be of any preferred size or make, and, hence, the same is of conventional construction, and the tractor includes the usual drawbar 10 and swinging clutch pedal 11.

In accordance with my invention, I provide a clutch operating lever 12 rockably mounted adjacent its lower end on a pivot pin 13 carried by a bracket 14 secured to the tractor at an appropriate point. The upper end of the lever is connected by a chain 15 to the clutch pedal 11 through the medium of a clamp 16. Rotatably mounted on the bracket 14 below the pivot pin 13 is a cam 17, and this cam has trained thereabout and secured to its upper end a pull chain 18. At the point of connection of the chain 18 with the cam 17, the cam has secured thereto a contractile coil spring 19, which leads to and is connected with the upper end of the lever 12. The pull chain 18 leads to a part of the hitch H, for a purpose which will be later set forth, but at the present moment it is to be noted that the spring 19 holds the flat side of the cam 17 against the lower end of the lever 12, and that upon pull on the chain 18 the cam 17 will be rotated, and the high point thereof will be moved into engagement with the lower end of the lever 12 against the tension of the spring 19. This will pull on the connecting chain 15 and throw out the clutch.

The clutch spring itself will be sufficient to hold the lower end of the lever 12 against the high point of the cam, so that the cam will not be turned by its spring 19. However, it is merely necessary to slightly push in on the pedal 11 to release the pressure on the upper end of the lever 12, at which time the spring 19 will turn the cam back until its flat face is again in position for engagement with the lower end of the lever. Upon release of the clutch pedal by the foot of the operator, the clutch will be thrown in in the ordinary way.

The farming implement has not been illustrated, and only a fragment of the implement or plow coupling P has been shown in Figure 1. The plow coupling P can be of any preferred character and is detachably coupled to a certain part of the hitch H, as will be also hereinafter more fully described.

My novel hitch H includes a front drawhead 20 having a pair of spaced plates 21 for receiving therebetween the tractor drawbar 10. A bolt 16' is employed for connecting the plates 21 of the drawhead 20 to the tractor drawbar. The drawhead 20 also includes a cross plate 22 and a pair of spaced rigid supporting bars 23. All of the parts 21, 22, and 23 are rigidly connected together, and the terminals of the crossbar 22 have rigidly secured thereto, such as by welding, a pair of relatively long, rearwardly extending guide rods 24.

Slidably mounted upon the guide rods 24 are guide sleeves 25, and these sleeves are rigidly connected to the crosshead 26, and the sleeves, in effect, form a part of said crosshead. Thus, the crosshead 26 is slidable on the rods 24.

A U-shaped bracket 27 is arranged in a horizontal plane between the guide rods 24. The legs of the U-shaped bracket are provided with feet 28, which are slidably mounted on the rods 24, and, hence, the bracket 27 can move on the guide rods 24 independently of the sleeves 25.

Adjustably mounted on the rear ends of the guide rods 24 are nuts 29, and confined between the nuts 29 and the feet 28 or sleeves 25 are the relatively long cushion coil springs 30. These springs 30 are coiled about the rods 24 and normally urge the bracket 27 forwardly and the crosshead 26 with the sleeves 25 into engagement with the drawhead 20.

Rigidly fastened to the crosshead 26, such as by welding or the like, is the rearwardly extending pull bar 31. This pull bar 31 lies between and below the guide rods 24, and the pull bar slides with the crosshead 26 on the guide rods. The pull bar is provided at spaced points with openings, whereby the plow coupling can be connected to the best advantage to the pull bar 31.

From the construction so far, it can be seen that the drawhead 20 of the hitch and the pull bar 31 are slidably and resiliently united, so that the pull bar can give or move relative to the tractor when the plow strikes a rigid form, such as a rock, roots, or the like.

Means is provided for throwing out the clutch of the tractor as soon as the plow strikes a solid object. This means consists of a swinging hitch lever 32, the lower end of which is rockably mounted upon a pivot pin 33 carried by the parallel bars 23 forming a part of the drawhead 20. The upper end of the lever is provided with a downwardly and forwardly inclined arm 34, and this arm has connected therewith the chain 18, which is connected to the swinging operating lever 12 arranged on the tractor for the clutch pedal 11. Arranged in front of the hitch lever 32 is an operating cross plate 35, which is connected with the sleeves 25, and this cross plate 35, in effect, forms a part of the crosshead 26. Upon the pulling back of the crosshead, the crossbar 35 will swing back the hitch lever 32, which will pull on the chain 18 and throw out the clutch of the tractor.

Under normal plowing conditions, means is provided for preventing swinging movement of the hitch lever 32 and for preventing movement of the crosshead 26 away from the drawhead 20. This means includes a trip lever 36, which is rockably mounted at its rear end on a pivot pin 37 carried by the U-shaped bracket 27. The trip lever 36 has formed thereon a right-angularly extending foot 38, and an expansion coil spring 39 is placed between the trip lever 36 and an adjacent part of the hitch for normally urging the trip lever 36 to a raised position in the path of the swinging movement of the hitch lever 32. Upward swinging movement of the trip lever 36 is limited by the set screw 40 carried by the U-shaped bracket 27, and by adjusting the screw 40, the height of the raising of the trip lever 36 can be regulated, and, hence, the operation of the hitch can be set within certain limits according to the hardness of the ground, load, and other plowing conditions.

When the hitch lever 32 is in a raised position, as shown in Figures 1, 2, and 3, the forward end of the trip lever 36 will engage the hitch lever 32, and the hitch H is in position for normal plowing. The springs 30 hold the U-shaped bracket 27 forwardly and the trip lever 36 into firm engagement with the hitch lever 32.

Upon the impact of the plow with a solid object, a heavy jerk will be exerted on the crosshead 26, the drawhead 20, and on the hitch lever 32 for swinging the hitch lever 32 down. This acts against the trip lever 36 and tends to push back the trip lever 36 against the tension of the springs 30 and to swing the trip lever 36 down below the hitch lever 32. This allows the lever 32 to be swung downwardly, which will immediately throw out the clutch of the tractor by pulling back on the chain 18.

Figure 4:
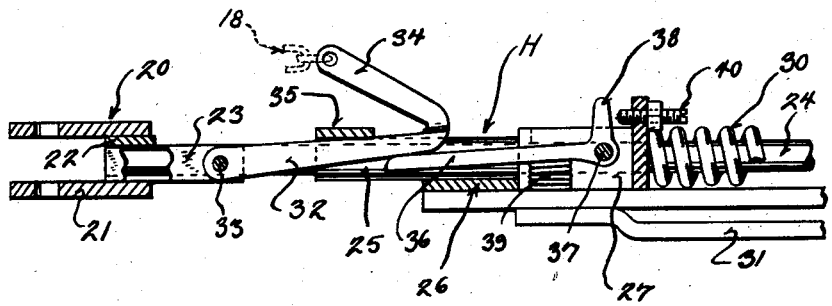
Figure 4 is a view similar to Figure 3, but showing the separation of the hitch parts after the impact of the plow with a solid object.
Figure 5:
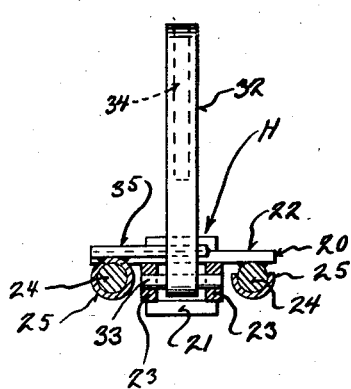
Figure 5 is a transverse, sectional view through the hitch, taken on the line 5—5 of Figure 3, looking in the direction of the arrows.
Figure 6:
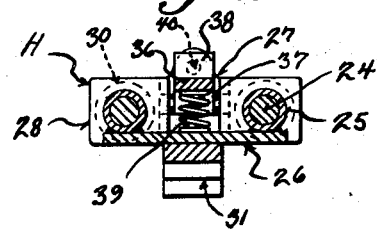
Figure 6 is a transverse, sectional view through the hitch, taken on the line 6—6 of Figure 3, looking in the direction of the arrows.

It would appear that a heavy jerk would force the elements 35, 32, and 36 in closer engagement, which would prevent the moving down of the trip lever 36 to the position shown in Figure 4. However, attention is called to the fact that the hitch lever 32 is on a stationary pivot, which is carried by the drawhead 20, and that the trip lever 36 moves with the crosshead 26. Consequently, upon the rearward movement of the crosshead 26 away from the drawhead 20, the trip lever 36 is carried away from the hitch lever 32. As the cross plate 35 is connected with the crosshead 26, the same tends to swing back the hitch lever 32, which gradually forces the trip lever 36 down to the position shown in Figure 4. The front upper corner of the trip lever 36 is rounded, as is clearly shown in Figures 3 and 4, which also facilitates the desired movement between the hitch lever 32 and the trip lever 36.

Now, the hitch lever 32 can move forwardly with the drawhead 20, and the entire cushioning function of the springs 30 is brought into play. This position of the hitch is clearly shown in Figures 2A and 4, and as illustrated in these figures, the trip lever 36 is swung to a lowered position by the hitch lever 32.

Shock is absorbed by the relatively long springs 30, and, hence, breakage of the plow, the hitch, or tractor parts is prevented, and upon release of the plow from the solid object, the heavy springs 30 will return the plow to its normal position, and the crosshead 26 back into engagement with the drawhead 20. The spring 39 swings up the trip lever 36, and the upward movement of the trip lever 36 will return the hitch lever 32 to its normal position.

The operator, by merely pressing down on the clutch pedal, will automatically reset the parts of the clutch disconnecting mechanism on the tractor, as previously described, so that upon the removal of the foot from the clutch pedal, the clutch will be thrown in and the tractor will resume its normal operation.

From the above description it can be seen that the springs 30 form a dual purpose and function. First, the springs operate to hold the trip lever 36 in place against the hitch lever 32 to carry the load, and, second, to cushion the jar after the actuation of the trip lever 36. As also brought out above, the springs 30 also function to return the plow and tractor to their normal position.

Particular attention is again invited to the adjusting screw 40, and by turning the screw 40 in or out, the trip lever 36 can be raised or lowered. This will vary the leverage of the lever 32 relative to its pivot point, the point of engagement of the lever 32 with the crosshead 26, and the trip lever 36. This will change the tension at which the lever 32 will trip.

From the foregoing description, it can be seen that I have provided an exceptionally simple and durable form of tractor hitch, which will effectively accomplish the purpose intended.

Particular stress is laid on the springs 30, and it is obvious that my arrangement of the springs 30 can be used with this hitch as illustrated in the drawings or with other types of hitches.

Likewise, my novel hitch lever and trip lever arrangement can be used on other types of hitches than that illustrated.

Other changes in details may be made without departing from the spirit or the scope of my invention, but what I claim as new is:

1. A tractor hitch comprising, a drawhead for connection with the drawbar of a tractor, a crosshead for connection with the hitch of a plow movable toward and away from the drawhead, spring means resisting movement of the crosshead away from the drawhead, a swinging hitch lever pivotally carried by the drawhead, a crossbar on the crosshead normally disposed in front of the lever and engaging the lever for swinging the lever to a lowered position upon rearward movement of the crosshead against the tension of said springs, and a pivoted trip lever carried by the crosshead normally arranged in the path of the swinging movement of the first-mentioned lever and movable away from the lever upon impact of the plow with a solid object.

2. A tractor hitch comprising, a drawhead for connection with the drawbar of a tractor, a crosshead for connection with the hitch of a plow movable toward and away from the drawhead, spring means resisting movement of the crosshead away from the drawhead, a swinging hitch lever pivotally carried by the drawhead, a crossbar on the crosshead normally disposed in front of the lever and engaging the lever for swinging the lever to a lowered position upon rearward movement of the crosshead against the tension of said springs, a pivoted trip lever carried by the crosshead normally arranged in the path of the swinging movement of the first-mentioned lever and movable away from the lever upon impact of the plow with a solid object, and spring means normally resisting movement of the trip lever and for holding the trip lever normally in its raised position in the path of the first-mentioned lever.

3. A tractor hitch comprising, a drawhead for connection with the drawbar of a tractor, a crosshead for connection with the hitch of a plow movable toward and away from the drawhead, spring means resisting movement of the crosshead away from the drawhead, a swinging hitch lever pivotally carried by the drawhead, a crossbar on the crosshead normally disposed in front of the lever and engaging the lever for swinging the lever to a lowered position upon rearward movement of the crosshead against the tension of said springs, a pivoted trip lever carried by the crosshead normally arranged in the path of the swinging movement of the first-mentioned lever and movable away from the lever upon impact of the plow with a solid object, and a pull chain connected with said first-mentioned lever for connection with the clutch of a tractor.

4. A tractor hitch comprising, a drawhead for connection with the drawbar of a tractor, a crosshead for connection with the hitch of a plow movable toward and away from the drawhead, spring means resisting movement of the crosshead away from the drawhead, a swinging hitch lever pivotally carried by the drawhead, a crossbar on the crosshead normally disposed in front of the lever and engaging the lever for swinging the lever to a lowered position upon rearward movement of the crosshead against the tension of said springs, a pivoted trip lever carried by the crosshead normally arranged in the path of the swinging movement of the first-mentioned lever and movable away from the lever upon impact of the plow with a solid object, spring means normally resisting movement of the trip lever, and for holding the trip lever normally in its raised position in the path of the first-mentioned lever, and adjustable means for limiting the upward swinging movement of the trip lever and the normal position thereof relative to the first-mentioned lever, whereby to adjust the hitch for different plowing conditions.

5. A tractor hitch comprising, a drawhead for connection with the drawbar of a tractor, rearwardly directed guide rods secured to the drawhead, a crosshead for connection with a plow hitch freely slidable upon the guide rods and movable toward and away from the drawhead, a hitch lever pivotally mounted upon the drawhead, means on the crosshead engaging the hitch lever to normally swing the hitch lever to a lowered position, a trip lever rockably mounted at its rear end and normally held in a raised position in engagement with the hitch lever and in the path of the swinging movement thereof, and relatively long cushion and shock-absorbing springs arranged upon said rods and functioning, first, to hold the trip lever and hitch lever in engagement, whereby the hitch lever will be prevented from swinging movement under normal plowing conditions, and, second, to absorb shock upon the release of the trip lever and the swinging movement of the hitch lever.

6. A tractor hitch comprising, a drawhead for connection with the drawbar of a tractor, rearwardly directed guide rods secured to the drawhead, a crosshead for connection with a plow hitch freely slidable upon the guide rods and movable toward and away from the drawhead, a hitch lever pivotally mounted upon the drawhead, means on the crosshead engaging the hitch lever to normally swing the hitch lever to a lowered position, a trip lever rockably mounted at its rear end and normally held in a raised position in engagement with the hitch lever and in the path of the swinging movement thereof, relatively long cushion and shock-absorbing springs arranged upon said rods and functioning, first, to hold the trip lever and hitch lever in engagement, whereby the hitch lever will be prevented from swinging movement under normal plowing conditions, and, second, to absorb shock upon the release of the trip lever and the swinging movement of the hitch lever, and means for adjusting the height of engagement of the trip lever with the hitch lever.

7. In a hitch, a drawhead, rearwardly directed guide rods on the drawhead, a crosshead slidably mounted on the guide rods having a cross plate, a bracket slidably mounted upon the guide rods, a hitch lever rockably mounted at its lower end on the drawbar in rear of the cross plate, whereby the cross plate normally tends to pull back down on the hitch lever, a trip lever rockably mounted at its rear end on the bracket, spring means normally holding the trip lever in a raised position against the hitch lever for preventing swinging movement thereof, and coil springs on said guide rods normally holding the bracket forwardly and the trip lever in engagement with the hitch lever.

8. In a hitch, a drawhead, rearwardly directed guide rods on the drawhead, a crosshead slidably mounted on the guide rods having a cross plate, a bracket slidably mounted upon the guide rods, a hitch lever rockably mounted at its lower end on the drawbar in rear of the cross plate, whereby the cross plate normally tends to pull back down on the hitch lever, a trip lever rockably mounted at its rear end on the bracket, spring means normally holding the trip lever in a raised position against the hitch lever for preventing swinging movement thereof, coil springs on said guide rods normally holding the bracket forwardly and the trip lever in engagement with the hitch lever, and a set screw for limiting the upward swinging movement of the trip lever.

9. In a tractor having a clutch including an operating member therefor, of a releasable hitch connected with the tractor having a pull chain extending forwardly therefrom for operating the clutch, a clutch operating lever rockably mounted adjacent its lower end on the tractor, a flexible connection between the upper end of the lever and the clutch operating member, a cam having a flat side rotatably mounted adjacent the lower end of the lever, a spring connection between the upper end of the lever and the cam for normally holding the flat side of the cam in engagement with the lower end of the lever, and means connecting the pull chain to the cam for rotating the cam, so that the high point of the cam will strike the lower end of the lever and actuate the same and the clutch operating member.

10. In a tractor having a clutch including an operating member therefor, of a releasable hitch connected with the tractor having a pull chain extending forwardly therefrom for operating the clutch, a clutch operating lever rockably mounted adjacent its lower end on the tractor, a flexible connection between the upper end of the lever and the clutch operating member, a cam having a flat side rotatably mounted adjacent the lower end of the lever, a spring connection between the upper end of the lever and the cam for normally holding the flat side of the cam in engagement with the lower end of the lever, and means connecting the pull chain to the cam for rotating the cam, so that the high point of the cam will strike the lower end of the lever and actuate the same and the clutch operating member, the normal tension of the clutch operating member being such as to hold the clutch operating lever and the cam against retrograde movement by said spring connection until manual release of said clutch operating member.

11. In a hitch, a drawhead, relatively long rearwardly directed guide rods on the drawhead, a crosshead slidably mounted on the guide rods having a cross plate, a bracket slidably mounted upon the guide rods, a hitch lever rockably mounted at its lower end on the drawbar in rear of the cross plate, whereby the cross plate normally tends to pull back down on the hitch lever, a trip lever rockably mounted at its rear end on the bracket, spring means normally holding the trip lever in a raised position against the hitch lever for preventing swinging movement thereof, and coil springs on said guide rods normally holding the bracket forwardly and the trip lever in engagement with the hitch lever, said coil springs extending substantially the full length of the guide rods for resisting rearward movement of the crosshead and bracket upon release of the hitch lever by the trip lever.

MICHAEL A. ENDRES.